United States Patent
Carter et al.

(10) Patent No.: US 11,557,065 B2
(45) Date of Patent: Jan. 17, 2023

(54) AUTOMATIC SEGMENTATION FOR SCREEN-BASED TUTORIALS USING AR IMAGE ANCHORS

(71) Applicant: FUJIFILM Business Innovation Corp., Tokyo (JP)

(72) Inventors: Scott Carter, San Jose, CA (US); Laurent Denoue, Veneto (IT); Yulius Tjahjadi, Palo Alto, CA (US); Gerry Filby, San Francisco, CA (US)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 16/897,023

(22) Filed: Jun. 9, 2020

(65) Prior Publication Data

US 2021/0248787 A1    Aug. 12, 2021

Related U.S. Application Data

(63) Continuation-in-part of application No. 16/786,827, filed on Feb. 10, 2020.

(51) Int. Cl.
*G06T 11/00* (2006.01)
*G06T 7/70* (2017.01)
*G06V 40/20* (2022.01)

(52) U.S. Cl.
CPC ............. *G06T 11/00* (2013.01); *G06T 7/70* (2017.01); *G06V 40/28* (2022.01); *G06T 2200/24* (2013.01)

(58) Field of Classification Search
CPC ....... G06T 11/00; G06T 7/70; G06T 2200/24; G06K 9/00355
See application file for complete search history.

(56) References Cited

U.S. PATENT DOCUMENTS

| | | | |
|---|---|---|---|
| 2014/0064566 A1* | 3/2014 | Shreve | H04N 7/181 382/107 |
| 2014/0184644 A1* | 7/2014 | Sharma | G06F 3/017 345/633 |
| 2017/0262967 A1* | 9/2017 | Russell | G06T 7/0002 |
| 2018/0047192 A1 | 2/2018 | Kristal et al. | |
| 2018/0290057 A1* | 10/2018 | Mullins | G06T 3/40 |
| 2020/0074692 A1 | 3/2020 | Ooba | |
| 2021/0090209 A1 | 3/2021 | Appleboim et al. | |

OTHER PUBLICATIONS

Adobe Aero, Adobe.com, [online] retrieved Jan. 14, 2020, 8 pgs., URL: https://www.adobe.com/products/aero.html.
Amazon Sumerian, aws.amazon.com, [online], retrieved Jan. 14, 2020, 11 pgs. URL: https://aws.amazon.com/sumerian/.
(Continued)

*Primary Examiner* — Tapas Mazumder
(74) *Attorney, Agent, or Firm* — Procopio, Cory, Hargreaves & Savitch LLP

(57) ABSTRACT

Example implementations described herein involve systems and methods for a mobile application device to playback and record augmented reality (AR) overlays indicating gestures to be made to a recorded device screen. A device screen is recorded by a camera of the mobile device, wherein a mask is overlaid on a user hand interacting with the device screen. Interactions made to the device screen are detected based on the mask, and AR overlays are generated corresponding to the reactions.

14 Claims, 10 Drawing Sheets

(56) References Cited

OTHER PUBLICATIONS

Apple Reality Composer, developer.apple.com, [online], retrieved Jan. 14, 2020, 4 pgs., URL: https://developer.apple.com/augmented-reality/reality-composer/.

Scope AR, scopear.com, [online], retrieved Sep. 1, 2019, 12 pgs., URL: https://www.scopear.com/.

Carter, S., et al., Creating Tutorials with Web-Based Authoring and Heads-Up Capture, IEEE Pervasive Computing, 2015, pp. 44-52.

Chi, P-Y, et al., DemoCut: Generating Concise Instructional Videos for Physical Demonstrations, UIST'13, Oct. 8-11, 2013, St. Andrews, U.K., pp. 141-150.

Erkoyuncu, J.A., et al., Improving Efficiency of Industrial Maintenance with Context Aware Adaptive Authoring in Augmented Reality, CIRP Annals—Manufacturing Technology, 66, 2017, pp. 465-468.

Grossman, T., et al., ToolClips: An Investigation of Contextual Video Assistance for Functionality Understanding, In Proceedings of the SGCHI Conference on Human Factors in Computing Systems, CHI'10 Apr. 10-15, 2010, Atlanta, GA, pp. 1515-1524.

Haringer, M., et al., A Pragmatic Approach to Augmented Reality Authoring, Proceedings of the International Symposium on Mixed and Augmented Reality (ISMAR'02), 2002, 9 pgs.

Langlotz, T., et al., Sketching Up the World: In-Situ Authoring for Mobile Augmented Reality, Personal and Ubiquitous Computing, 2012, 16(6), 9 pgs.

Schleuter, J.A., Remote Maintenance Assistance Using Real-Time Augmented Reality Authoring, Iowa State University, Graduate Theses and Dissertations, 2018, 72 pgs.

* cited by examiner

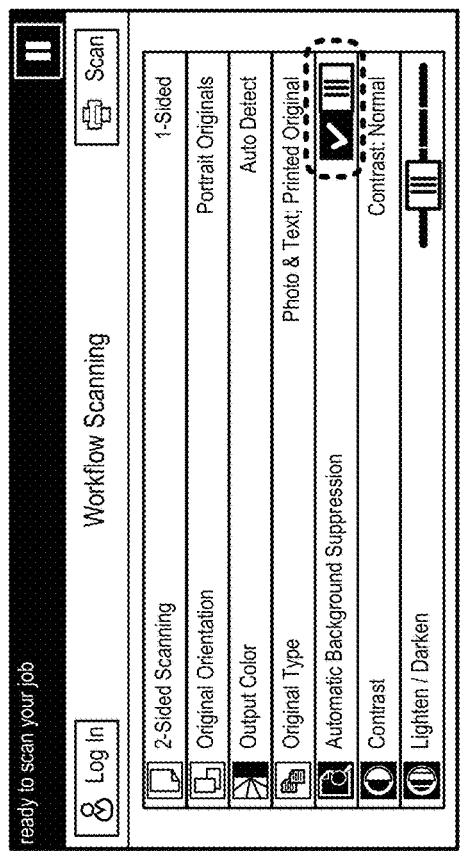
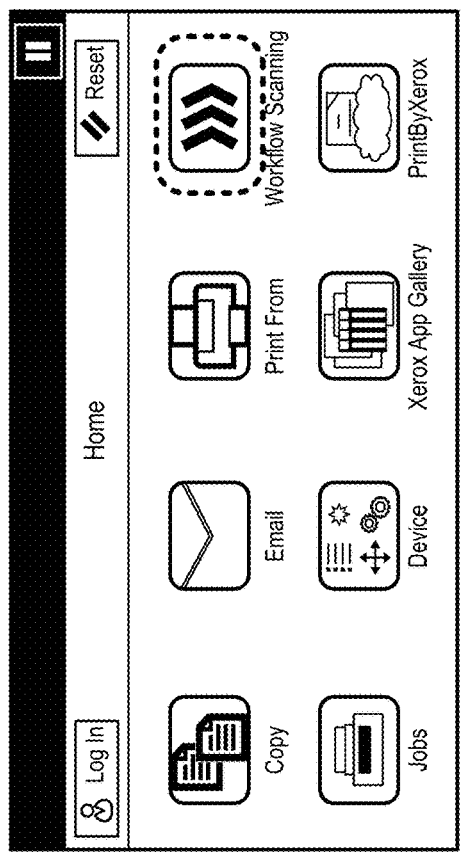
FIG. 3(b)
FIG. 3(a)

Device Screen table

| Recording ID | Reference image(s) |
|---|---|
| 1 | REF1, REF11, ... |
| 2 | REF2 |
| 3 | REF3, ... |
| 4 | REF4, REF41, .... |
| ... | .... |

FIG. 7

AUTOMATIC SEGMENTATION FOR SCREEN-BASED TUTORIALS USING AR IMAGE ANCHORS

CROSS REFERENCE TO RELATED APPLICATIONS

This application as a Continuation-in-Part application of U.S. patent application Ser. No. 16/786,827, filed on Feb. 10, 2020, the contents of which is incorporated herein by reference in its entirety for all purposes.

BACKGROUND

Field

The present disclosure relates generally to augmented reality (AR) systems, and more specifically, to facilitating screen-based tutorials through using AR image anchors.

Related Art

In the related art, creating tutorials for augmented reality systems often requires extensive coding experience. Even when using What You See Is What You Get (WYSIWYG) creation tools, tutorial designers must create three dimensional (3D) models, import them, and organize both their spatial and temporal configuration. This time-consuming process can make it difficult to create the quantity of AR-based tutorials necessary to build a useful library of solutions.

SUMMARY

Example implementations described herein involve a system that can ingest screen-based video tutorials and output a segmentation of the video corresponding to steps as well as gesture- and interactor-based annotations. A separate client application imports these clips and annotations and allows end users to follow the tutorial at their own pace.

Aspects of the present disclosure can involve a non-transitory computer readable medium, storing instructions for executing a process for a device having a camera and a processor, the instructions involving detecting a device screen from images received from the camera; upon initiation of a recording of the detected device screen, generating perspective corrected frames of the detected device screen from the images received from the camera; and generating a mask on gestures made to the detected device screen detected from the images received from the camera; processing the recording for reference images of the device screen, and interactions made to the device screen based on the mask; and generating augmented reality (AR) overlays for the reference images based on the interactions made to the device screen based on the mask.

Aspects of the present disclosure can involve a method for a device having a camera and a processor, the method involving detecting a device screen from images received from the camera; upon initiation of a recording of the detected device screen, generating perspective corrected frames of the detected device screen from the images received from the camera; and generating a mask on gestures made to the detected device screen detected from the images received from the camera; processing the recording for reference images of the device screen, and interactions made to the device screen based on the mask; and generating augmented reality (AR) overlays for the reference images based on the interactions made to the device screen based on the mask.

Aspects of the present disclosure can involve a device involving a camera and a processor configured to detect a device screen from images received from the camera; upon initiation of a recording of the detected device screen, generate perspective corrected frames of the detected device screen from the images received from the camera; and generate a mask on gestures made to the detected device screen detected from the images received from the camera; process the recording for reference images of the device screen, and interactions made to the device screen based on the mask; and generate augmented reality (AR) overlays for the reference images based on the interactions made to the device screen based on the mask.

Aspects of the present disclosure can involve a system involving means for detecting a device screen from images received from the camera; means for, upon initiation of a recording of the detected device screen, generating perspective corrected frames of the detected device screen from the images received from the camera; and generating a mask on gestures made to the detected device screen detected from the images received from the camera; means for processing the recording for reference images of the device screen, and interactions made to the device screen based on the mask; and means for generating augmented reality (AR) overlays for the reference images based on the interactions made to the device screen based on the mask.

Aspects of the present disclosure can include a non-transitory computer readable medium, storing instructions for executing a process for a device involving a camera and a processor, the instructions involving detecting a device screen from images received from the camera; retrieving a recording corresponding to the detected device screen; upon initiation of a playback of the recording corresponding to the detected device screen, playing the recording corresponding to the detected device screen until an augmented reality (AR) overlay corresponding to an interaction is reached; stopping the recording until a change is detected on the detected device screen from the images received from the camera; and continuing playback of the recording once the change is detected on the detected device screen.

Aspects of the present disclosure can include a method for a device involving a camera and a processor, the instructions involving detecting a device screen from images received from the camera; retrieving a recording corresponding to the detected device screen; upon initiation of a playback of the recording corresponding to the detected device screen, playing the recording corresponding to the detected device screen until an augmented reality (AR) overlay corresponding to an interaction is reached; stopping the recording until a change is detected on the detected device screen from the images received from the camera; and continuing playback of the recording once the change is detected on the detected device screen.

Aspects of the present disclosure can include a device involving a camera and a processor, the device further involving means for detecting a device screen from images received from the camera; means for retrieving a recording corresponding to the detected device screen; upon initiation of a playback of the recording corresponding to the detected device screen, means for playing the recording corresponding to the detected device screen until an augmented reality (AR) overlay corresponding to an interaction is reached; means for stopping the recording until a change is detected on the detected device screen from the images received from the camera; and means for continuing playback of the recording once the change is detected on the detected device screen.

Aspects of the present disclosure can include a device involving a camera and a processor, the processor configured to detect a device screen from images received from the camera; retrieve a recording corresponding to the detected device screen; upon initiation of a playback of the recording corresponding to the detected device screen, play the recording corresponding to the detected device screen until an augmented reality (AR) overlay corresponding to an interaction is reached; stop the recording until a change is detected on the detected device screen from the images received from the camera; and continue playback of the recording once the change is detected on the detected device screen.

Aspects of the present disclosure can further involve a non-transitory computer readable medium, storing instructions for a management apparatus configured to facilitate an application for a mobile device, the instructions involving receiving a recording of a device screen having perspective corrected frames of the device screen and a mask on gestures made to the device screen; processing the recording for reference images of the device screen, and interactions made to the device screen based on the mask; and generating augmented reality (AR) overlays for the reference images based on the interactions made to the device screen based on the mask. As will be described herein, the mask on the gestures will correspond to the finger/hand of the expert user.

Aspects of the present disclosure can further involve a method for a management apparatus configured to facilitate an application for a mobile device, the method involving receiving a recording of a device screen having perspective corrected frames of the device screen and a mask on gestures made to the device screen; processing the recording for reference images of the device screen, and interactions made to the device screen based on the mask; and generating augmented reality (AR) overlays for the reference images based on the interactions made to the device screen based on the mask.

Aspects of the present disclosure can further involve a management apparatus configured to facilitate an application for a mobile device, the management apparatus involving means for receiving a recording of a device screen comprising perspective corrected frames of the device screen and a mask on gestures made to the device screen; means for processing the recording for reference images of the device screen, and interactions made to the device screen based on the mask; and means for generating augmented reality (AR) overlays for the reference images based on the interactions made to the device screen based on the mask.

Aspects of the present disclosure can further involve a management apparatus configured to facilitate an application for a mobile device, the management apparatus involving a processor configured to receive a recording of a device screen involving perspective corrected frames of the device screen and a mask on gestures made to the device screen; process the recording for reference images of the device screen, and interactions made to the device screen based on the mask; and generate augmented reality (AR) overlays for the reference images based on the interactions made to the device screen based on the mask.

BRIEF DESCRIPTION OF DRAWINGS

FIGS. 3(a) and 3(b) illustrate examples of the AR viewer application, in accordance with an example implementation.

FIG. 7 illustrates an example device screen table, in accordance with an example implementation.

DETAILED DESCRIPTION

Figures 1A, 1B:
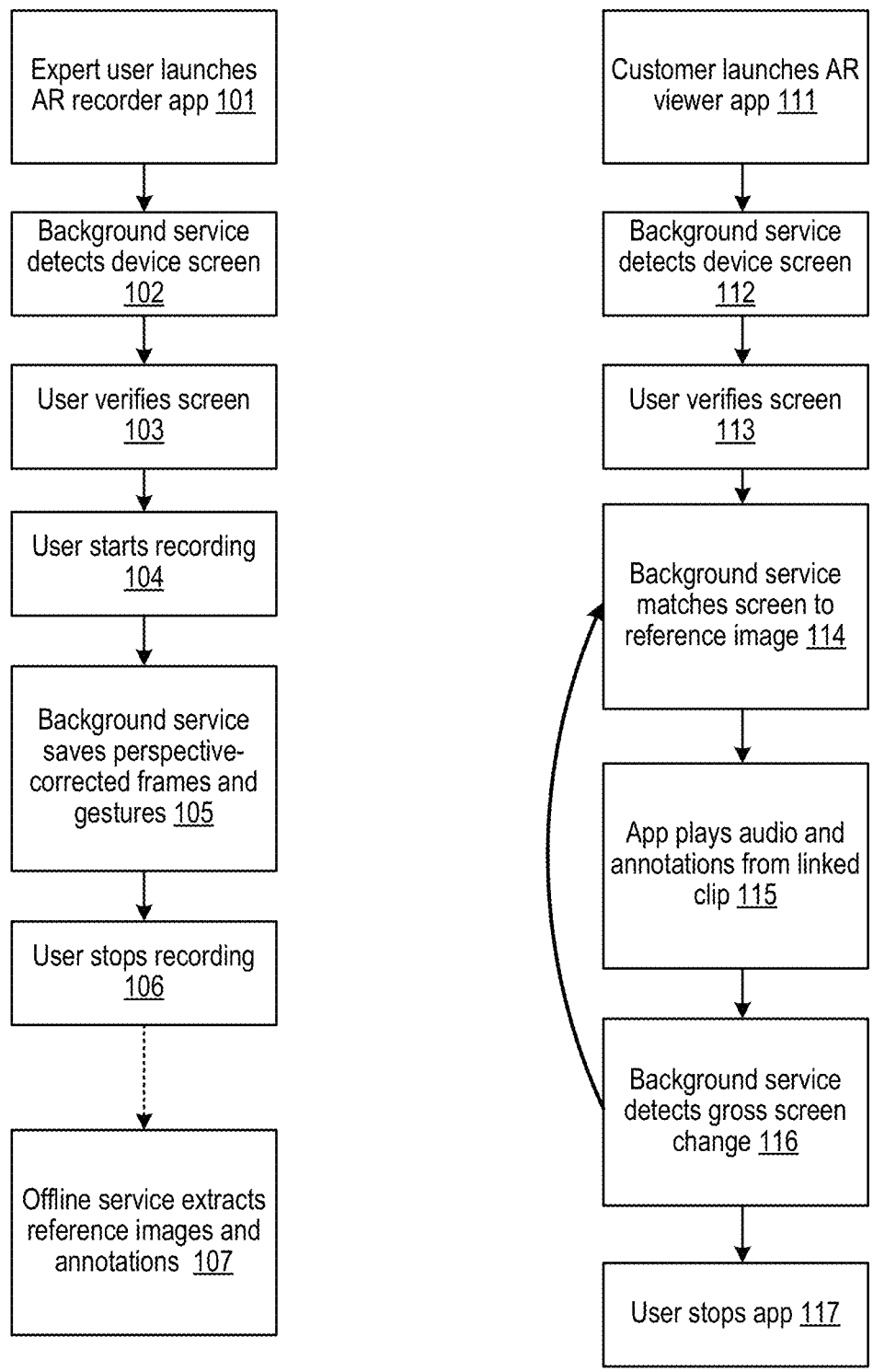
FIGS. 1(a) and 1(b) illustrate an example flow diagram of the dataflow for the AR recorder and viewer, respectively, in accordance with an example implementation.

The following detailed description provides details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application. Selection can be conducted by a user through a user interface or other input means, or can be implemented through a desired algorithm. Example implementations as described herein can be utilized either singularly or in combination and the functionality of the example implementations can be implemented through any means according to the desired implementations.

FIGS. 1(a) and 1(b) illustrate an example flow diagram of the dataflow for the AR recorder and viewer, respectively, in accordance with an example implementation.

In example implementations illustrated in FIG. 1(a), the expert utilizes the AR recorder application to record a session. At 101, the expert engineer launches the AR recorder application and points their device toward the screen for which they want to record a session. At 102, the application launches a background service that continuously observes the environment. At 103, the background service scans the scene to detect a device screen. Once it detects a screen it alerts the foreground service, which asks the expert user to verify that the screen is correct. At 104, upon verification by the expert user, the recording by the expert user begins. At 105, the background service then extracts and perspective corrects the screen content and records these frames into a video file, either on-device and uploaded later, or uploaded in real-time to a server depending on the desired implementation. At 106, the application also applies a mask of the hand/fingers that appear when the expert user reaches over and interacts with the screen contents (e.g., to press buttons, move sliders, and so on). This mask can be encoded over the same video frames as a separate color (e.g., green color to facilitate later analysis). Depending on the desired implementation, the transmission/display can involving sending two frames (one of the video and one of the mask), or one frame that contains two stacked images: one with the mask only, and one with the original image. Through such an example implementation, the mask can be made invisible to the expert user, but the application is still able to compute what it needs and infer the finger and hand gestures.

At 107 once the session completes, the recording ends and a background service (e.g., on the device or in a cloud service), processes the video to extract key-frames when the mask of the hands/fingers is not overlaying any screen content; these frames become reference image(s) that the viewer app can use later as illustrated in FIGS. 2(a) to 2(e). When the hand/finger mask is present, the service extracts the touch location by identifying the fingertip of the index (e.g., assuming that the expert user uses their index finger to tap the screen during a recording). These interactions will become AR overlays during playback by the viewer app as illustrated in FIGS. 3(a) and 3(b).

Through such example implementations, experts can thereby create a recording of a tutorial video which incorporates reference images of the detected device screen and AR overlays to indicate the appropriate gestures/interactions to the device screen for the end user. Depending on the desired implementation, audio may also be recorded and incorporated into the tutorial video during the recording of the detected device screen. Through the example implementations, experts can make a tutorial video for any external device screen for users to view, such as a printer screen, computer screen, appliance panel, and so on. The tutorial video can then be provided to a database managed by a server based cloud system, which can be loaded for a user device upon detecting a similar device screen.

In the example of FIG. 1(b), at any time later and completely asynchronously without the need of a live connection to an expert (or even the network), suppose a customer needs help operating a screen.

At 111, the customer needing help launches the AR viewer application and points their device toward the screen with which they need help. At 112, the application launches a background service that continuously observes the environment. At 113, the background service scans the scene to detect a device screen. Once it detects a screen it alerts the foreground service, which optionally asks the user to verify that the screen is correct. At 114, the background service then matches the detected screen content with previously recorded reference image(s). At 115, the application then begins playing the audio of the clip linked to the AR reference image, while showing extracted annotations (e.g., gestures and interface interactions) overlaid onto the AR scene as found from the recording of 104-107. At 116, once the clip completes, it pauses and waits for the end user to carry out the clip instructions. At 117, once the background service detects a gross change in screen content, the application repeats the viewer at 114.

In example implementations described herein, the device screen that is detected can involve any type of device screen external to the mobile device that can be captured by the camera, such as a tabletop screen, a laptop screen, a printer screen, a television screen, and any other three dimensional screens in accordance with an example implementation. A rectangle is overlaid on the 3D plane of the screen and perspective corrected frames of the detected device can thereby be generated for stability. Thus, through such example implementations, a stable view can be presented of the detected device screen from the video of the mobile device as well as to detect what is changing in the detected device screen. Locations of interactions made to the detected device screen can thereby be made with respect to the coordinates within the rectangle bounding the detected device screen.

Figure 2B:
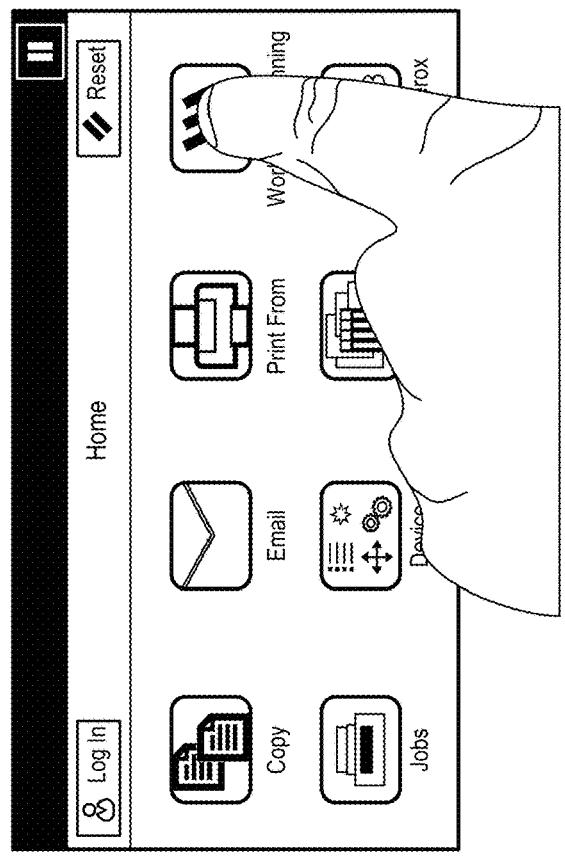
FIGS. 2(a) to 2(e) illustrate an example process of recording a tutorial, in accordance with an example implementation.
Figure 2A:
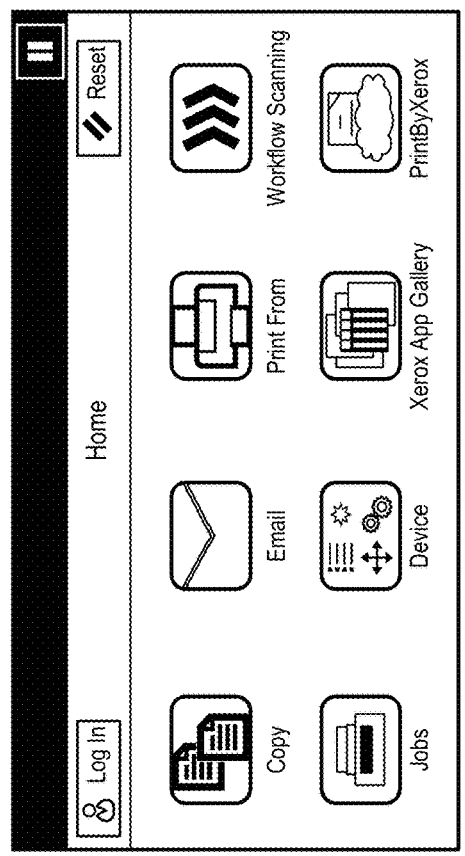
Figure 2C:
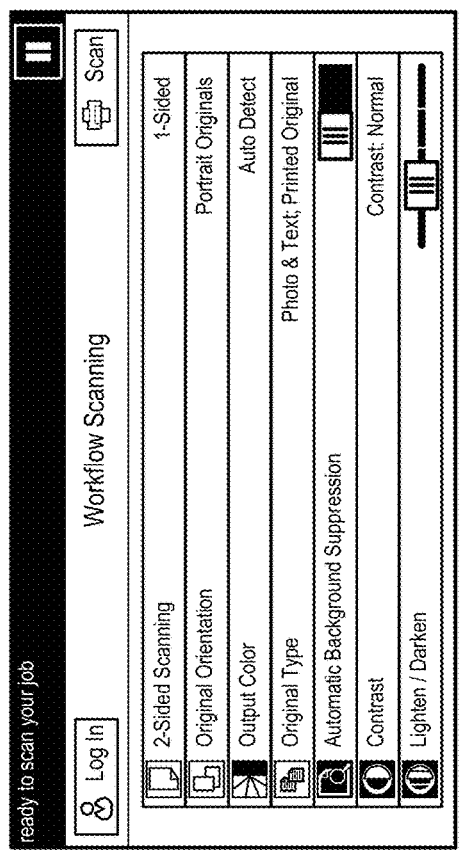
Figure 2D:
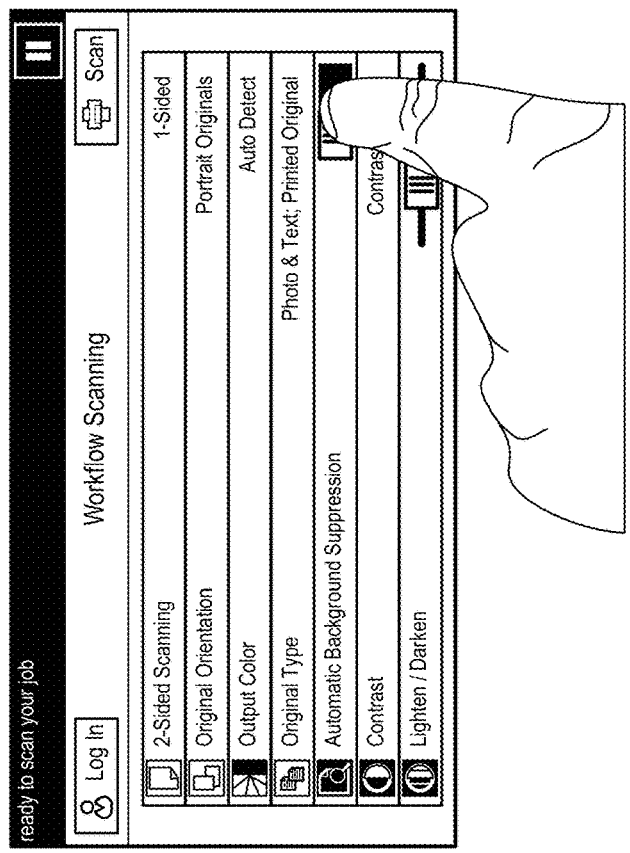
Figure 2E:
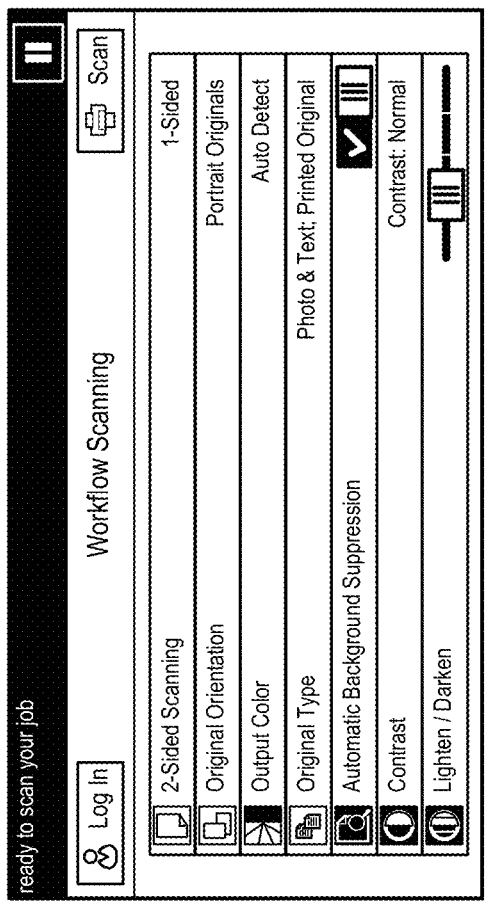

FIGS. 2(a) to 2(e) illustrate an example process of recording a tutorial, in accordance with an example implementation. The process of recording a tutorial is similar to recording a standard how-to video. Here, the author captures the main screen at FIG. 2(a) and selects an interactor at FIG. 2(b) which causes the system to load a new screen at FIG. 2(c). The automatic analysis system can detect this gross change to the screen contents and automatically create a clip boundary at this point. The system can distinguish when the author modifies an interactor on the screen as illustrated in FIG. 2(d) and FIG. 2(e), and creates an interactor-based annotation rather than a clip boundary.

Thus, there are various types of interactions made to the detected device screen that can be determined based on the examples of FIGS. 2(a) to 2(e) and FIG. 1(a). One type of interaction can involve a large change (e.g., below a threshold) between two reference images when only a minor dynamic change was detected from the mask interaction. Such an interaction and reference image change would indicate that a button press was conducted with a tap gesture that changed a page on the device screen. In another example, there is a minor change (e.g., below a threshold) with a similar minor dynamic change. Such an interaction and minor change in the reference image would indicate that some user interface component was changed (e.g., pressing a radio button, changing a switch, flipping a Boolean, etc.) and would indicate that a tap gesture was made to a user interface component. In another example, the detection of a major change (e.g., beyond a threshold) between reference images with a major dynamic change would indicate a gesture such as a swiping gesture that causes the screen to scroll. In the example implementations described herein, the differences can be determined based on changes between binarized images of the reference images, and the threshold can be set according to the desired implementation.

Whereas, if there is a major change between binarized images (e.g., beyond a threshold), such changes in images can indicate a scrolling action taking place, in particular if a number of reference images are generated beyond a threshold. Such change can also indicate that the screen page has merely moved from one page to another, so if only two reference image, or if the number of reference images are generated below a threshold, then the action can also be interpreted as a page change instead of a scrolling gesture.

As illustrated in FIGS. 2(a) to 2(e), the recording can be processed by the application to determine reference images based on the detected device screen, and interactions made to the detected device screen based on the mask by using frames from the recording in which the mask is not overlaid on the detected device screen as the reference images as illustrated in FIGS. 2(a), 2(c), and 2(e). As there is no detected hand mask as would be generated from the process in FIGS. 4(a) and 4(b) when a hand is recorded by the camera, FIGS. 2(a), 2(c) and 2(e) can thereby be determined as reference images for the recording to be used during playback.

FIGS. 3(a) and 3(b) illustrate examples of the AR viewer application, in accordance with an example implementation. As illustrated in FIGS. 3(a) and 3(b), the AR viewer application creates AR overlays to indicate where the customer needs to tap next.

Note that the AR viewer application can match screen anchor images to any clip, regardless of whether those clips appeared in the same original video. In this way, the end user can effectively navigate through a broad set of videos to address their specific problem automatically and without the burden of an explicit navigation interface. The system can optionally match other rectilinear physical content, such as paper or whiteboards, depending on the desired implementation.

Interaction with touch screens is typically limited to pressing buttons. Thus in example implementations, the system creates static AR overlays that snap to the underlying screen content, such as a button, a toggle switch, or a touch key for a letter on a virtual keyboard.

In some cases though, the user moves horizontal, vertical or circular widgets. These gestures are detected using the fingertip location and underlying screen content (e.g., using Hough lines and Hough circles). The system creates annotation objects that replace the actual fingertip paths with clean shapes (e.g., an arrow moving from point A to point B, a circular motion, and so on).

In example implementations, the AR recorder can be implemented as a mobile application for a mobile device (e.g., via AR toolkit), and/or a web browser using WebRTC to communicate between the mobile application and the browser.

Specifically, the AR toolkit implementation captures the rendered AR scene along with the hand mask of the person (e.g., computed using functions for person-segmentation frame semantics), which is processed on device and converted to a mask. This mask is added onto the raw video frame before it is sent to the recorder. Based on the reference images and the mask, the hand areas that are recorded can thereby be redacted as needed. The redaction of the hand mask can thereby be used to determine the point at the edge of the fingers of the mask to determine the location of the interaction as illustrated in FIG. 3(b). The point of the location as determined from the mask can thereby be used to highlight the underlying user interface element or location that will be used for generating the AR overlays and the type of AR overlay to be used.

In an example implementation, this recorder is implemented in the browser: the mobile application opens a live audio/video WebRTC stream with the web browser. On initialization, the web browser starts recording the live audio/video stream as a video file.

In addition to the user hand mask, the ARKit session in the mobile application runs an AR Reference Image detector. Whenever the expert user points the camera of the device to a known screen, the mobile application sends the 2D locations of the four corner points to the web application, wherein the web application encodes the coordinates around the video frame borders.

Figure 4B:
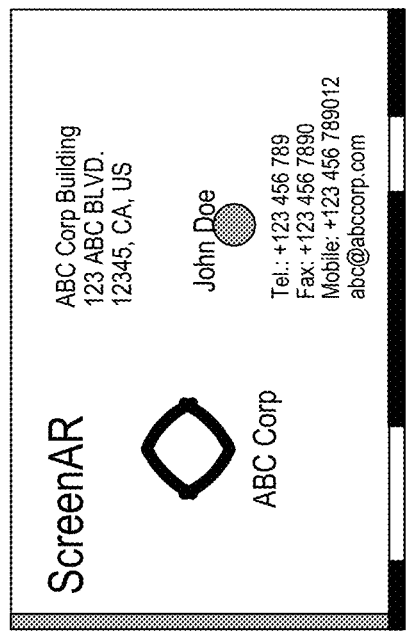
FIGS. 4(a) and 4(b) illustrates an example of an AR recording, in accordance with an example implementation.
Figure 4A:
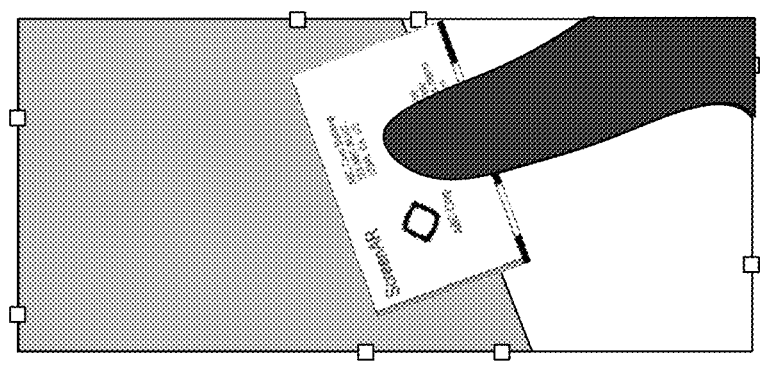

Upon receiving the video frames, the web browser then extracts the corner point locations to draw the rectified image into a new canvas element and extracts the mask pixels corresponding to the user hand and determines whether the hand or finger is present over the screen area. If the hand or finger is determined to be present, the web browser also computes an estimate of the index fingertip location as illustrated in FIGS. 4(a) and 4(b).

The system compares the new frame to previously recorded keyframes, without considering the hand mask areas. If a difference is found, a new keyframe is stored as shown in FIGS. 2(a) and 2(c). An annotation object is created around the last fingertip location, optionally matching the underlying content (e.g., around the button in FIG. 2(a)) as described in previous work.

Once the expert is done recording a session, they can check the results of the automatic processing and manually correct mistakes. For example, they can adjust the location of the annotation objects or remove keyframes that were wrongly added during analysis, such as those showing a part of the screen that changed but that was unrelated to the task.

Figure 3D:
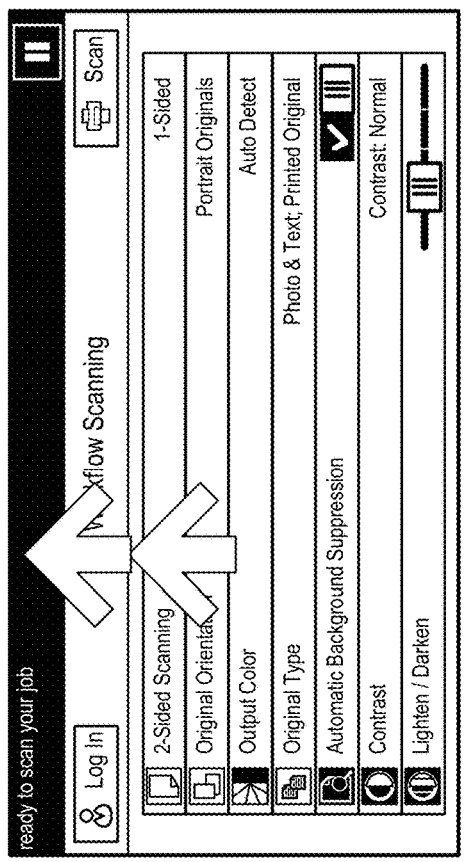
FIGS. 3(c) and 3(d) illustrates examples of types of AR overlays that can be generated, in accordance with an example implementation.
Figure 3C:
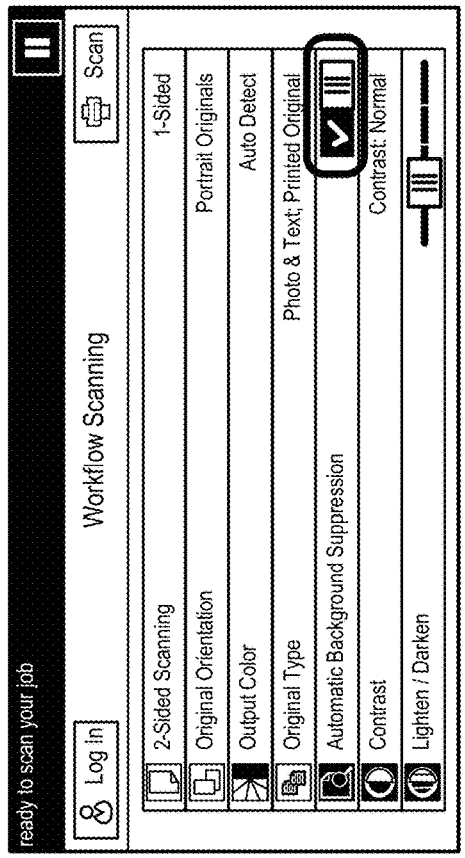

FIGS. 3(c) and 3(d) illustrate examples of types of AR overlays that can be generated in accordance with an example implementation. Specifically, FIG. 3(c) illustrates an example overlay type for a tap gesture, and FIG. 3(d) illustrates an example overlay type for a swipe/scroll gesture. As tap gestures tend to be focused on a particular user interface (UI) element, the location of the interaction on the detected device screen can be compared for example UI elements, and the UI element can be appropriately bounded with an AR overlay to indicate a tap gesture. In the case of swipe/scroll gestures, as such gestures can be anywhere on the device screen and tend to be directed to scrolling the screen, an AR overlay indicating the direction of the swipe can be utilized as illustrated in FIG. 3(d).

FIGS. 4(a) and 4(b) illustrates an example of an AR recording, in accordance with an example implementation. The mobile application as illustrated in FIG. 4(a) detects the corners of the target content (e.g., encoded as dots on the edges) as well as the user hand. The corner markers and mask over the user hand are forwarded to the web application but can optionally be hidden in the mobile application depending on the desired implementation. The web application as illustrated in FIG. 4(b) decodes the target corner locations and rectifies the target content. The system injects an annotation (e.g., in a circular shape) at the index fingertip location. Thus, interactions made to the detected device screen can be identified through injecting the location at the index fingertip location, which can be used as a location for an AR overlay.

In example implementations, the AR viewer is implemented as a mobile application which is configured to download newly created AR Reference Images and associated audio and annotation files. As the customer moves the device of the camera over a recognized AR Reference Image, the corresponding audio starts playing at the timestamp of the frame, and automatically stops before the timestamp of the next recorded keyframe. The annotation object is added to the AR session, helping the customer know where they need to press on the screen to transition to the next step.

When the customer performs the action, the screen content changes (e.g., transitioning from FIG. 2(a) to FIG. 2(c)) and the ARKit will detect a new AR Reference Image. The process repeats, as illustrated in the flow diagram of FIG. 1(b).

Figure 5:
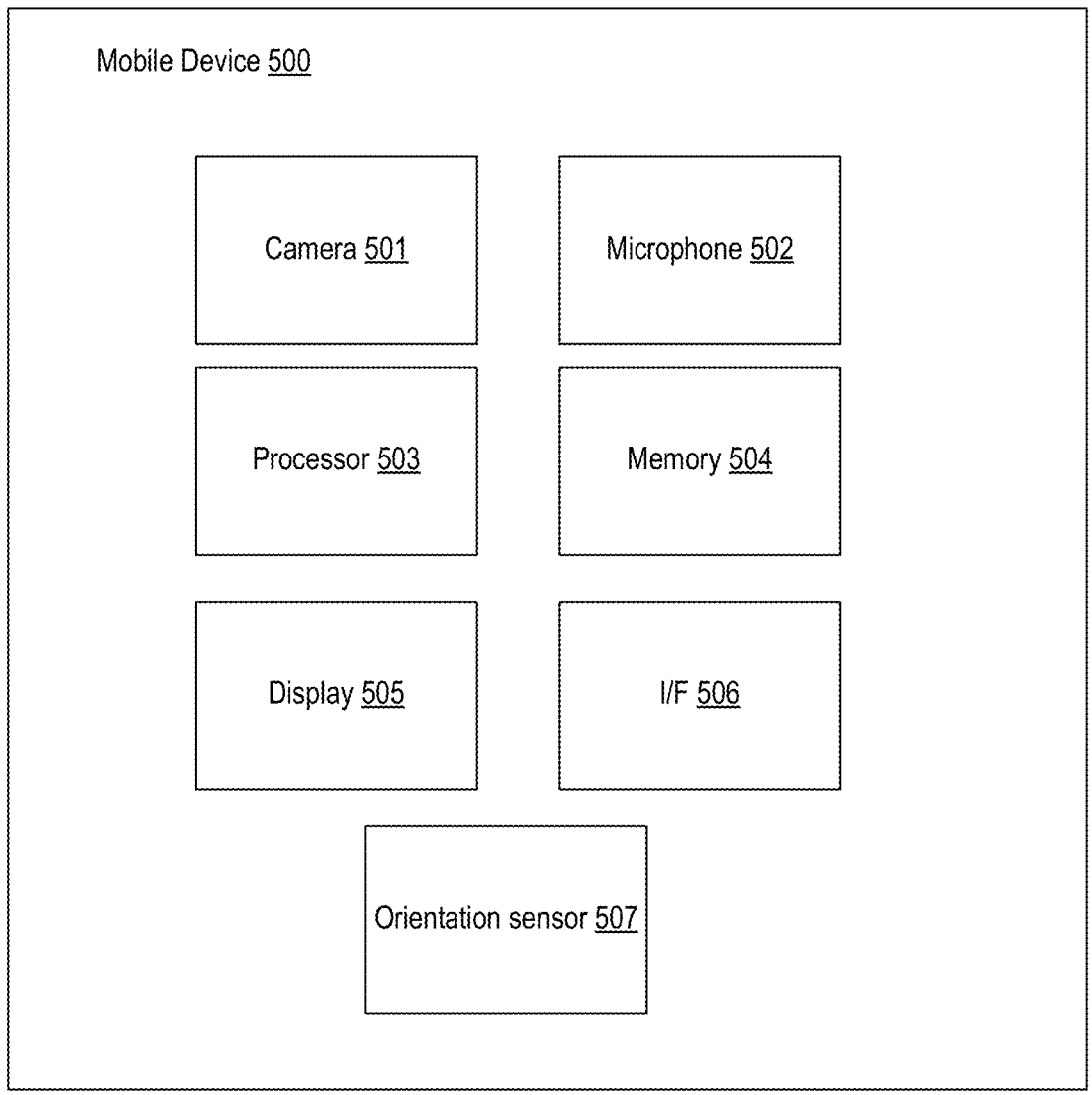
FIG. 5 illustrates an example of a computing device, in accordance with an example implementation.

FIG. 5 illustrates an example of a computing device, in accordance with an example implementation. Computing device can be in the form of a laptop, a personal computer, a mobile device, a tablet, or other devices in accordance with the desired implementation. Computing device 500 can include camera 501, microphone 502, processor 503, memory 504, display 505, interface (I/F) 506 and orientation sensor 507. Camera 501 can include any type of camera that is configured to record any form of video in accordance with the desired implementation. Microphone 502 can involve any form of microphone that is configured to record any form of audio in accordance with the desired implementation. Display 505 can involve a touch screen display configured to receive touch input to facilitate instructions to execute the functions as described herein, or a normal display such as a liquid crystal display (LCD) or any other display in accordance with the desired implementation. I/F 506 can include network interfaces to facilitate connections of the computing device 500 to external elements such as the server and any other device in accordance with the desired implementations. Processor 503 can be in the form of hardware processors such as central processing units (CPUs) or in a combination of hardware and software units in accordance with the desired implementation. The orientation sensor 507 can involve any form of gyroscope and/or accelerometer that is configured to measure any kind of orientation measurement, such as tilt angle, orientation with respect to x,y,z, access, acceleration (e.g., gravity) and so on in accordance with the desired implementation. Orientation sensor measurements can also involve gravity vector measurements to indicate the gravity vector of the device in accordance with the desired implementation. Computing device 500 can be utilized as a device for a local user, or a device for a remote assistant depending on the desired implementation.

In example implementations, processor(s) 503 can be configured to detect a device screen from images received from the camera 501, and upon initiation of a recording of the detected device screen, generating perspective corrected frames of the detected device screen from the images received from the camera and generating a mask on gestures made to the detected device screen detected from the images received from the camera as illustrated in FIG. 1(*a*) 101-106, process the recording for reference images of the device screen, and interactions made to the device screen based on the mask; and generate augmented reality (AR) overlays for the reference images based on the interactions made to the device screen based on the mask as illustrated at 107 of FIG. 1(*a*).

Processor(s) 503 can be configured to transmit, to a database, another recording for playback involving the reference images and the AR overlays as illustrated at 107 of FIG. 1(*a*) and FIG. 7. Once the extractions are complete, a recording can be generated for playback involving the reference images, the audio of the raw recording, and the AR overlays made to the reference images as illustrated in FIGS. 3(*a*) to 3(*d*). The recording for playback is then managed by a management table in a database as illustrated in FIG. 7.

Processor(s) 503 can be configured to process the recording for reference images of the detected device screen and interactions made to the detected device screen based on the mask by using frames from the recording in which the mask is not overlaid on the detected device screen as the reference images as illustrated in FIGS. 2(*a*) to 2(*e*) through the process of FIG. 1(*a*).

Processor(s) 503 can be configured to process the recording for reference images of the detected device screen and interactions made to the detected device screen based on the mask by identifying the interactions from identifying fingertip interactions on the detected device screen as illustrated in FIGS. 4(*a*) and 4(*b*).

Processor(s) 503 can be configured to generate augmented reality (AR) overlays for the reference images based on the interactions made to the detected device screen based on the mask by, for each of the interactions, determining a location for each of the AR overlays corresponding to the each of the interactions on the reference images based on a location of the each of the interactions as illustrated in FIGS. 4(*a*) and 4(*b*); determining a type for the each of the AR overlays based on differences between binarized images of the reference images corresponding to the interactions; and generating the each of the AR overlays for the each of the interactions on the reference images at the location on the reference images and according to the type as illustrated at FIGS. 3(*c*) and 3(*d*).

As illustrated in FIGS. 3(*c*) and 3(*d*), the determining the type for the each of the AR overlays based on differences between binarized images of the reference images corresponding to the interactions can involve, for the differences between binarized images being below a threshold, determining the type for the each of the AR overlays as a tap gesture overlay as illustrated in FIG. 3(*c*); and for the differences between binarized images indicating transitions between above the threshold, determining the type for the each of the AR overlays as a swipe gesture overlay as illustrated in FIG. 3(*d*).

For play back of the recording by the user, processor(s) 503 can be configured to detect a device screen from images received from the camera; retrieve a recording corresponding to the detected device screen; upon initiation of a playback of the recording corresponding to the detected device screen playing the recording corresponding to the detected device screen until an augmented reality (AR) overlay corresponding to an interaction is reached; stopping the recording until a change is detected on the detected device screen from the images received from the camera; and continuing playback of the recording once the change is detected on the detected device screen as illustrated in FIG. 1(*b*). As illustrated in FIGS. 3(*c*) and 3(*d*), the AR overlay can indicate one of a tap gesture or a scroll gesture to be made on a location of the detected device screen.

Figure 6:
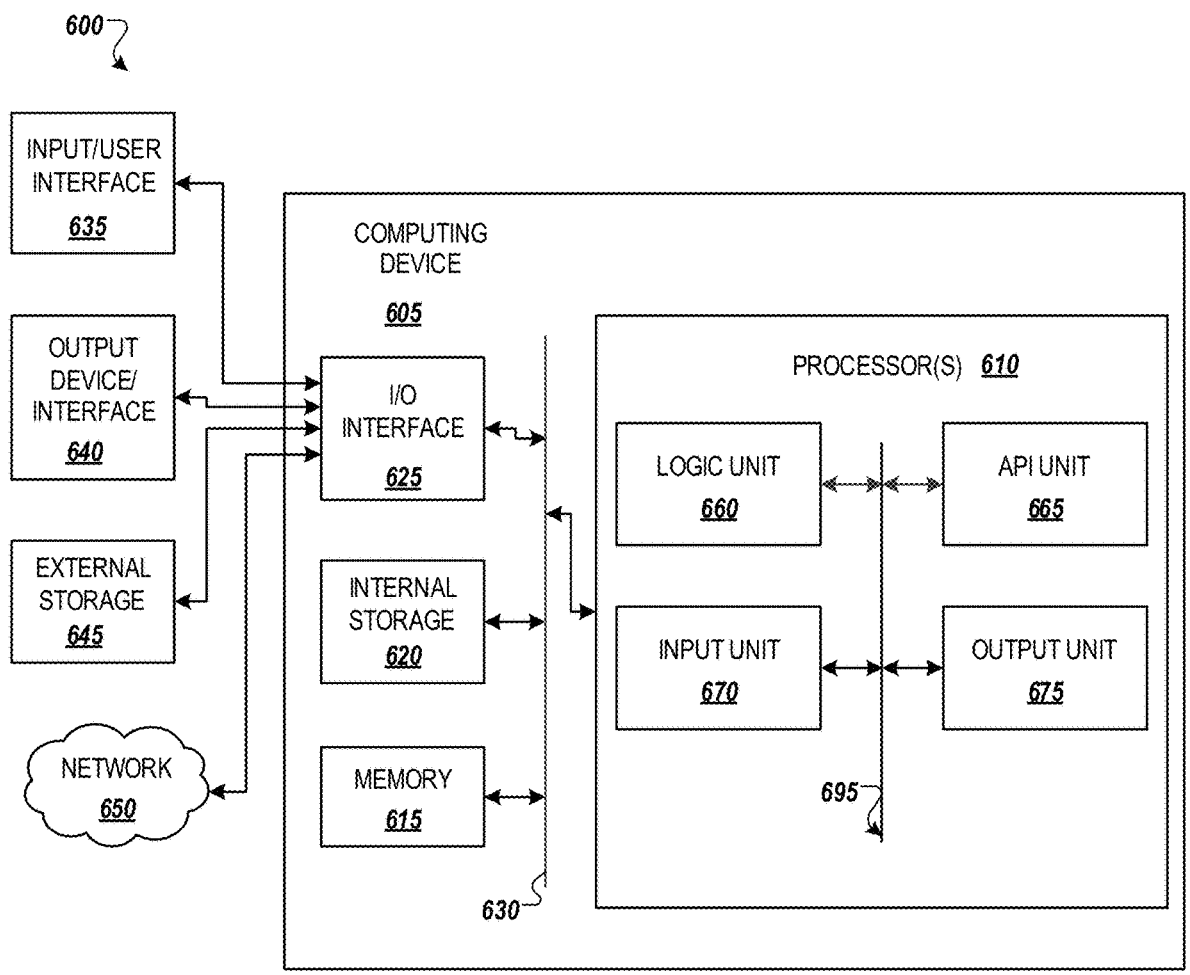
FIG. 6 illustrates an example computing environment with an example computer device suitable for use in some example implementations.

FIG. 6 illustrates an example computing environment with an example computer device suitable for use in some example implementations, such as a cloud server receiving, managing and providing AR recordings for AR applications on mobile devices from a database, and/or a management apparatus configured to facilitate an application for a mobile device.

Computer device 605 in computing environment 600 can include one or more processing units, cores, or processors 610, memory 615 (e.g., RAM, ROM, and/or the like), internal storage 620 (e.g., magnetic, optical, solid state storage, and/or organic), and/or 10 interface 625, any of which can be coupled on a communication mechanism or bus 630 for communicating information or embedded in the computer device 605. IO interface 625 is also configured to receive images from cameras or provide images to projectors or displays, depending on the desired implementation.

Computer device 605 can be communicatively coupled to input/user interface 635 and output device/interface 640. Either one or both of input/user interface 635 and output device/interface 640 can be a wired or wireless interface and can be detachable. Input/user interface 635 may include any device, component, sensor, or interface, physical or virtual, that can be used to provide input (e.g., buttons, touch-screen interface, keyboard, a pointing/cursor control, microphone, camera, braille, motion sensor, optical reader, and/or the like). Output device/interface 640 may include a display, television, monitor, printer, speaker, braille, or the like. In some example implementations, input/user interface 635 and output device/interface 640 can be embedded with or physically coupled to the computer device 605. In other example implementations, other computer devices may function as or provide the functions of input/user interface 635 and output device/interface 640 for a computer device 605.

Examples of computer device 605 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computer device 605 can be communicatively coupled (e.g., via IO interface 625) to external storage 645 and network 650 for communicating with any number of networked components, devices, and systems, including one or more computer devices of the same or different configuration. Computer device 605 or any connected computer device can be functioning as, providing services of, or referred to as a server, client, thin server, general machine, special-purpose machine, or another label.

TO interface 625 can include, but is not limited to, wired and/or wireless interfaces using any communication or IO protocols or standards (e.g., Ethernet, 802.11x, Universal System Bus, WiMax, modem, a cellular network protocol, and the like) for communicating information to and/or from at least all the connected components, devices, and network in computing environment 600. Network 650 can be any network or combination of networks (e.g., the Internet, local area network, wide area network, a telephonic network, a cellular network, satellite network, and the like).

Computer device 605 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computer device 605 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

Processor(s) 610 can execute under any operating system (OS) (not shown), in a native or virtual environment. One or more applications can be deployed that include logic unit 660, application programming interface (API) unit 665, input unit 670, output unit 675, and inter-unit communication mechanism 695 for the different units to communicate with each other, with the OS, and with other applications (not shown). The described units and elements can be varied in design, function, configuration, or implementation and are not limited to the descriptions provided. Processor(s) 610 can be in the form of hardware processors such as central processing units (CPUs) or in a combination of hardware and software units.

In some example implementations, when information or an execution instruction is received by API unit 665, it may be communicated to one or more other units (e.g., logic unit 660, input unit 670, output unit 675). In some instances, logic unit 660 may be configured to control the information flow among the units and direct the services provided by API unit 665, input unit 670, output unit 675, in some example implementations described above. For example, the flow of one or more processes or implementations may be controlled by logic unit 660 alone or in conjunction with API unit 665. The input unit 670 may be configured to obtain input for the calculations described in the example implementations, and the output unit 675 may be configured to provide output based on the calculations described in example implementations.

Memory 615 can be configured to manage a database of recordings to provide for playback that involve the reference images, audio from the raw video, and AR overlays generated through FIG. 1(a). Such a database can be managed through management information as illustrated in FIG. 7.

Processor(s) 610 can be configured to receive a recording of a device screen involving perspective corrected frames of the device screen and a mask on gestures made to the device screen as illustrated in FIG. 1(a), process the recording for reference images of the device screen, and interactions made to the device screen based on the mask; and generate augmented reality (AR) overlays for the reference images based on the interactions made to the device screen based on the mask as illustrated at 107 of FIG. 1(a). The recordings for playback can involve the reference images and the AR overlays and managed in a database by memory 615.

Processor(s) 610 is configured to process the recording for reference images of the device screen, and interactions made to the device screen based on the mask by using frames from the recording in which the mask is not overlaid on the detected device screen as the reference images as illustrated in FIGS. 3(a) to 3(d).

Processor(s) 610 is configured to process the recording for reference images of the device screen, and interactions made to the device screen based on the mask by identifying the interactions from identifying fingertip interactions on the detected device screen as illustrated in FIGS. 4(a) and 4(b).

Processor(s) 610 can be configured to generate augmented reality (AR) overlays for the reference images based on the interactions made to the device screen based on the mask by conducting, for each of the interactions, determining a location for each of the AR overlays corresponding to the each of the interactions on the reference images based on a location of the each of the interactions; determining a type for the each of the AR overlays based on differences between binarized images of the reference images corresponding to the each of the interactions; and generating the each of the AR overlays for the each of the interactions on the reference images at the location on the reference images and according to the type as illustrated in FIGS. 3(c) and 3(d).

Processor(s) 610 can be configured to determine the type for the each of the AR overlays based on differences between binarized images of the reference images corresponding to the interactions by, for the differences between binarized images being below a threshold, determining the type for the each of the AR overlays as a tap gesture overlay; and for the differences between binarized images indicating transitions between above the threshold, determining the type for the each of the AR overlays as a swipe gesture overlay as illustrated in FIGS. 3(c) and 3(d).

FIG. 7 illustrates an example device screen table, in accordance with an example implementation. Specifically, the device screen table can index recordings to reference images, and can be managed by the mobile device and/or the server managing the database depending on the desired implementation. When a reference image is detected from images received in the camera of the mobile device, the recording identifier (ID) of the recording in the database can be retrieved that corresponds to the reference image to facilitate the implementation illustrated in FIG. 1(b). The user can then select the corresponding recording for playback according to FIG. 1(b).

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

Moreover, other implementations of the present application will be apparent to those skilled in the art from consideration of the specification and practice of the teachings of the present application. Various aspects and/or components of the described example implementations may be used singly or in any combination. It is intended that the specification and example implementations be considered as examples only, with the true scope and spirit of the present application being indicated by the following claims.

What is claimed is:

1. A non-transitory computer readable medium, storing instructions for executing a process for a device comprising a camera and a processor, the instructions comprising:
    detecting a device screen from images received from the camera;
    upon initiation of a recording of the detected device screen, generating perspective corrected frames of the detected device screen from the images received from the camera; and
    generating a mask on gestures made to the detected device screen detected from the images received from the camera, wherein the mask is based on one or more frames from the recording;
    processing the recording for reference images of the device screen, and interactions made to the device screen based on the mask;
    generating augmented reality (AR) overlays for the reference images based on the interactions made to the device screen based on the mask;
    determining a type for each of the AR overlays based on differences between binarized images of the reference images corresponding to each of the interactions; and
    determining the type for the each of the AR overlays as a tap gesture overlay for the differences between binarized images being below a threshold.

2. The non-transitory computer readable medium of claim 1, the instructions further comprising transmitting, to a database, another recording for playback comprising the reference images and the AR overlays.

3. The non-transitory computer readable medium of claim 1, wherein the processing the recording for reference images of the detected device screen, and interactions made to the detected device screen based on the mask comprises using frames from the recording in which the mask is not overlaid on the detected device screen as the reference images.

4. The non-transitory computer readable medium of claim 1, wherein the processing the recording for reference images of the detected device screen, and interactions made to the detected device screen based on the mask comprises identifying the interactions from identifying fingertip interactions on the detected device screen.

5. The non-transitory computer readable medium of claim 1, wherein the generating augmented reality (AR) overlays for the reference images based on the interactions made to the detected device screen based on the mask comprises, for each of the interactions:
    determining a location for each of the AR overlays corresponding to the each of the interactions on the reference images based on a location of the each of the interactions; and
    generating the each of the AR overlays for the each of the interactions on the reference images at the location on the reference images and according to the type.

6. The non-transitory computer readable medium of claim 1, wherein the determining the type for the each of the AR overlays based on differences between binarized images of the reference images corresponding to the interactions comprises:
for the differences between binarized images indicating transitions between above the threshold, determining the type for the each of the AR overlays as a swipe gesture overlay.

7. A non-transitory computer readable medium, storing instructions for executing a process for a device comprising a camera and a processor, the instructions comprising:
detecting a device screen from images received from the camera;
retrieving a recording corresponding to the detected device screen;
upon initiation of a playback of the recording corresponding to the detected device screen:
playing the recording corresponding to the detected device screen until an augmented reality (AR) overlay corresponding to an interaction is reached;
stopping the recording until a change is detected on the detected device screen from the images received from the camera; and
continuing playback of the recording once the change is detected on the detected device screen.

8. The non-transitory computer readable medium of claim 7, wherein the AR overlay indicates one of a tap gesture or a scroll gesture to be made on a location of the detected device screen.

9. A non-transitory computer readable medium, storing instructions for a management apparatus configured to facilitate an application for a mobile device, the instructions comprising:
receiving a recording of a device screen comprising perspective corrected frames of the device screen and a mask on gestures made to the device screen;
processing the recording for reference images of the device screen, and interactions made to the device screen based on the mask, wherein the mask is based on one or more frames from the recording;
generating augmented reality (AR) overlays for the reference images based on the interactions made to the device screen based on the mask;
determining a type for each of the AR overlays based on differences between binarized images of the reference images corresponding to each of the interactions; and
determining the type for the each of the AR overlays as a tap gesture overlay for the differences between binarized images being below a threshold.

10. The non-transitory computer readable medium of claim 9, the instructions further comprising storing, in a database, another recording for playback comprising the reference images and the AR overlays.

11. The non-transitory computer readable medium of claim 9, wherein the processing the recording for reference images of the device screen, and interactions made to the device screen based on the mask comprises using frames from the recording in which the mask is not overlaid on the detected device screen as the reference images.

12. The non-transitory computer readable medium of claim 9, wherein the processing the recording for reference images of the device screen, and interactions made to the device screen based on the mask comprises identifying the interactions from identifying fingertip interactions on the detected device screen.

13. The non-transitory computer readable medium of claim 9, wherein the generating augmented reality (AR) overlays for the reference images based on the interactions made to the device screen based on the mask comprises, for each of the interactions:
determining a location for each of the AR overlays corresponding to the each of the interactions on the reference images based on a location of the each of the interactions; and
generating the each of the AR overlays for the each of the interactions on the reference images at the location on the reference images and according to the type.

14. The non-transitory computer readable medium of claim 9, wherein the determining the type for the each of the AR overlays based on differences between binarized images of the reference images corresponding to the interactions comprises:
for the differences between binarized images indicating transitions between above the threshold, determining the type for the each of the AR overlays as a swipe gesture overlay.

* * * * *